Aug. 12, 1947.  T. HINDLE  2,425,676
HYDRAULIC SHEDDING MEANS
Filed Sept. 23, 1944  14 Sheets-Sheet 2

INVENTOR
Thomas Hindle
By [signature]
ATTORNEYS

Aug. 12, 1947. T. HINDLE 2,425,676
HYDRAULIC SHEDDING MEANS
Filed Sept. 23, 1944 14 Sheets-Sheet 3
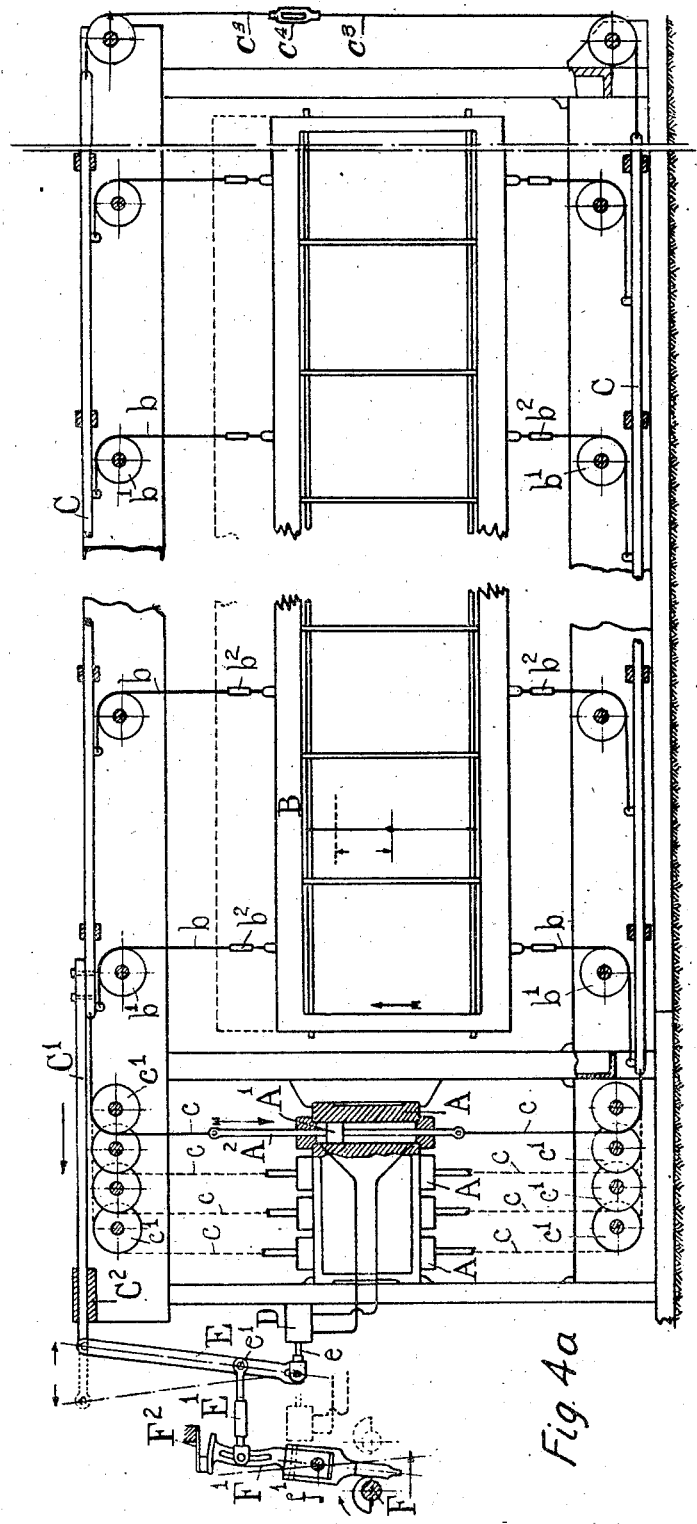
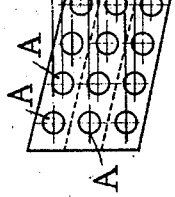
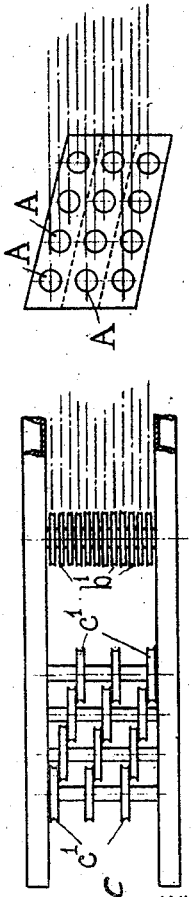
INVENTOR
Thomas Hindle
By
ATTORNEYS

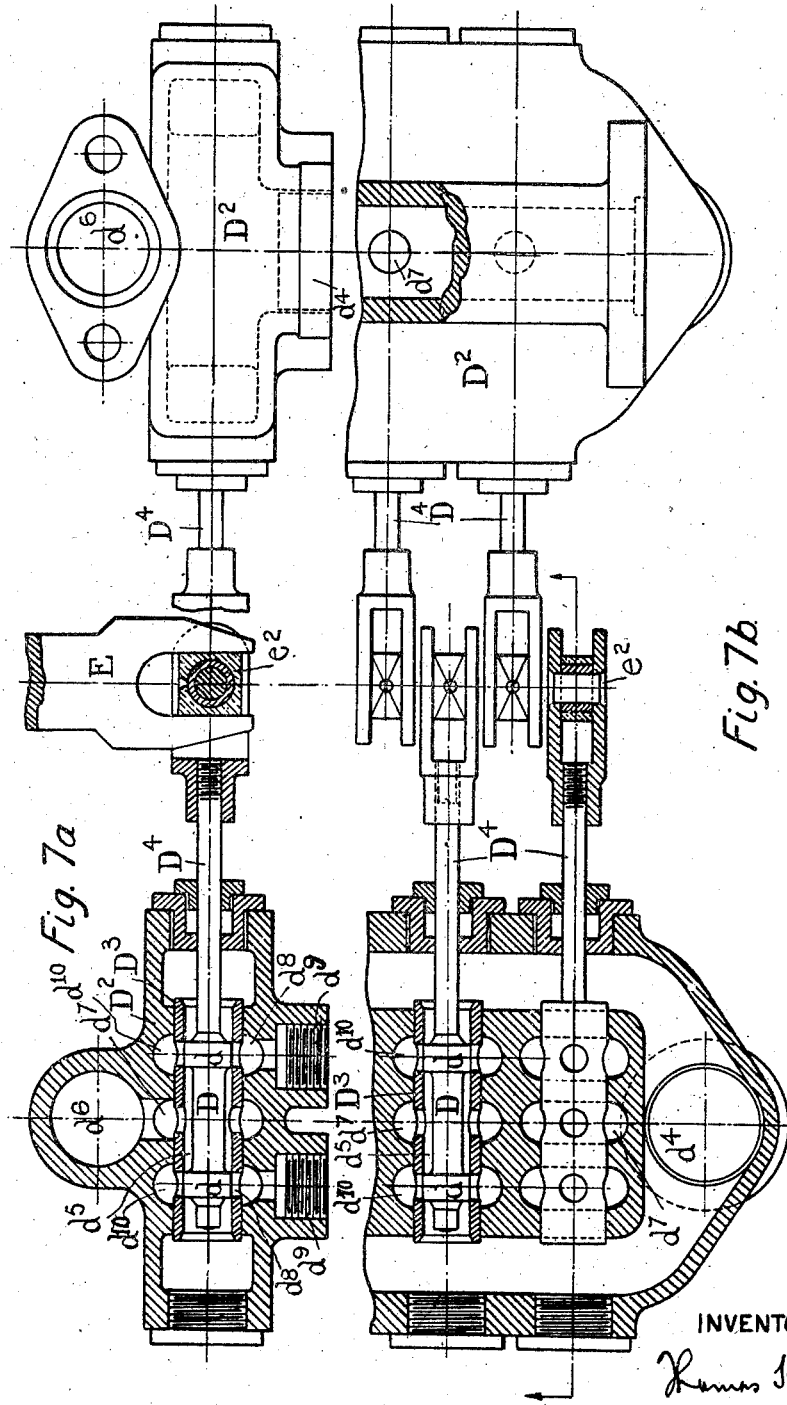

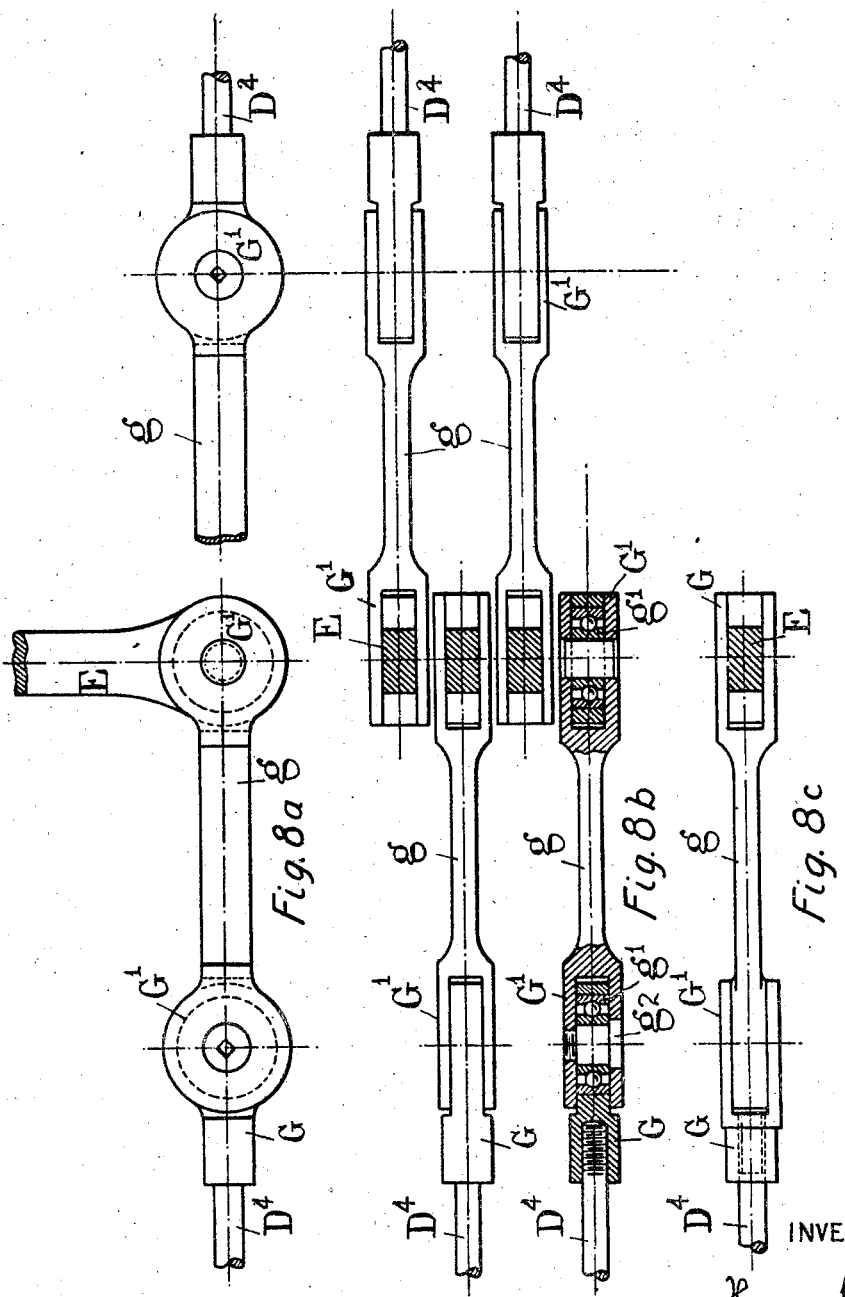

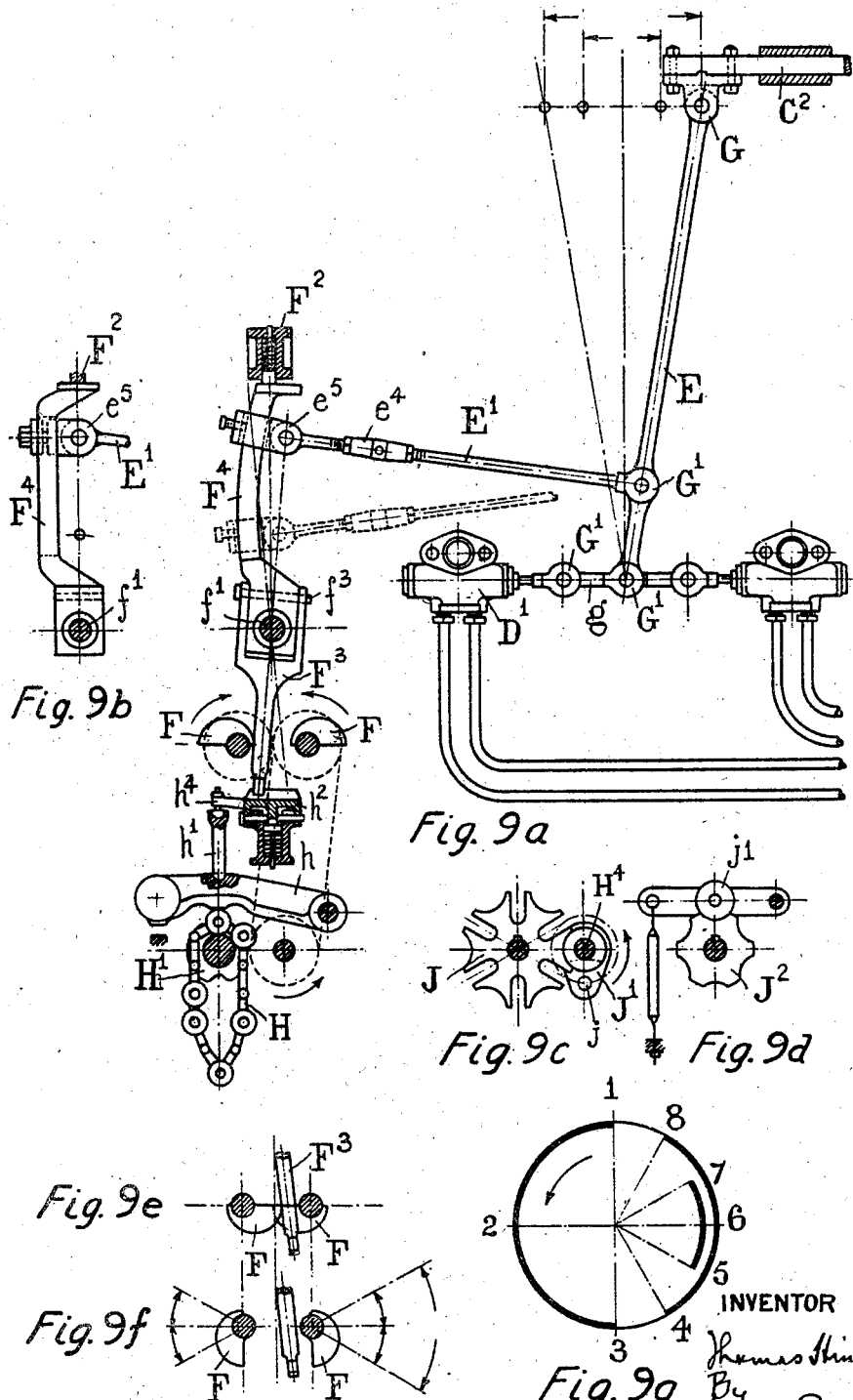

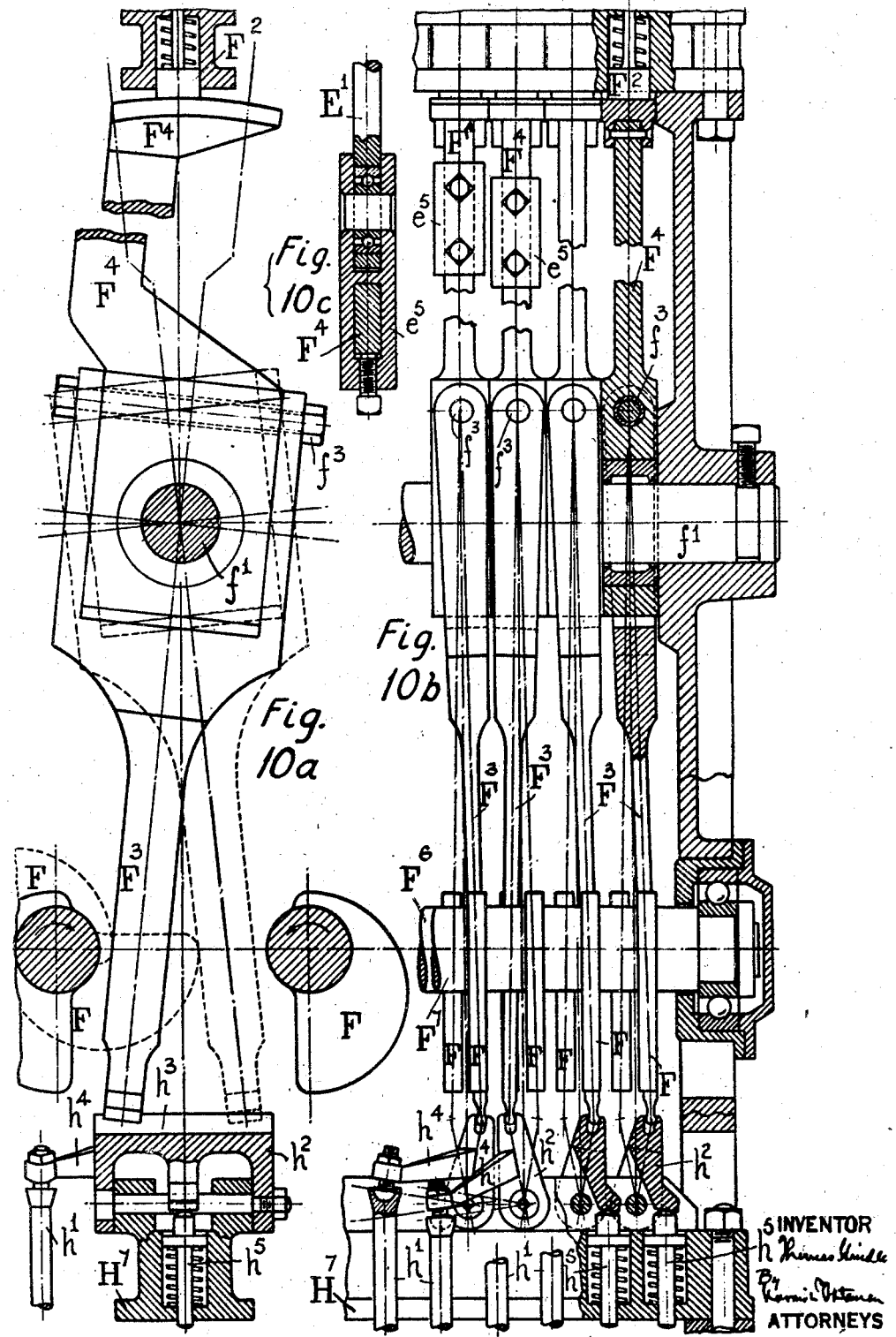

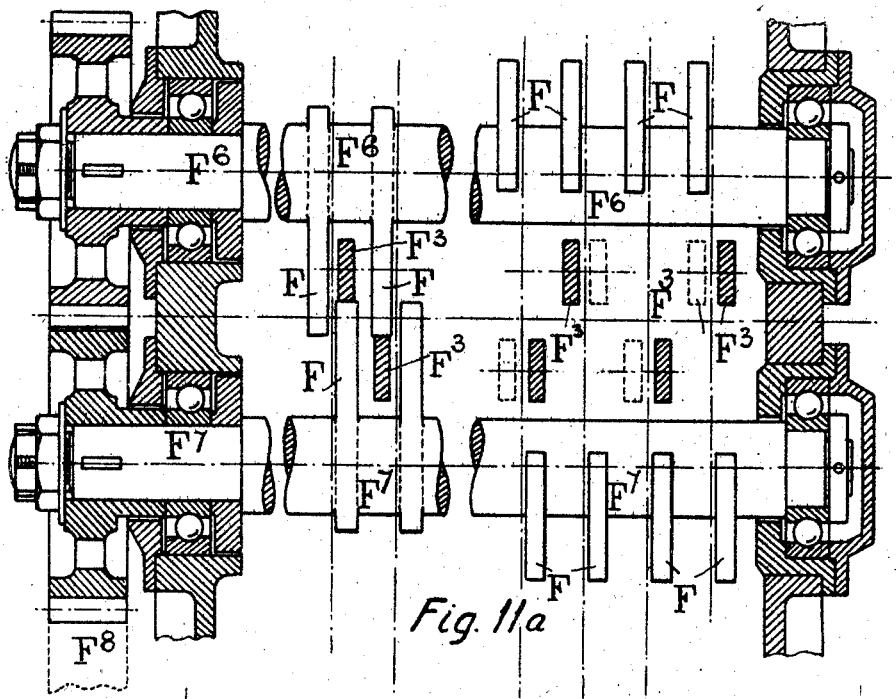
Fig. 11a
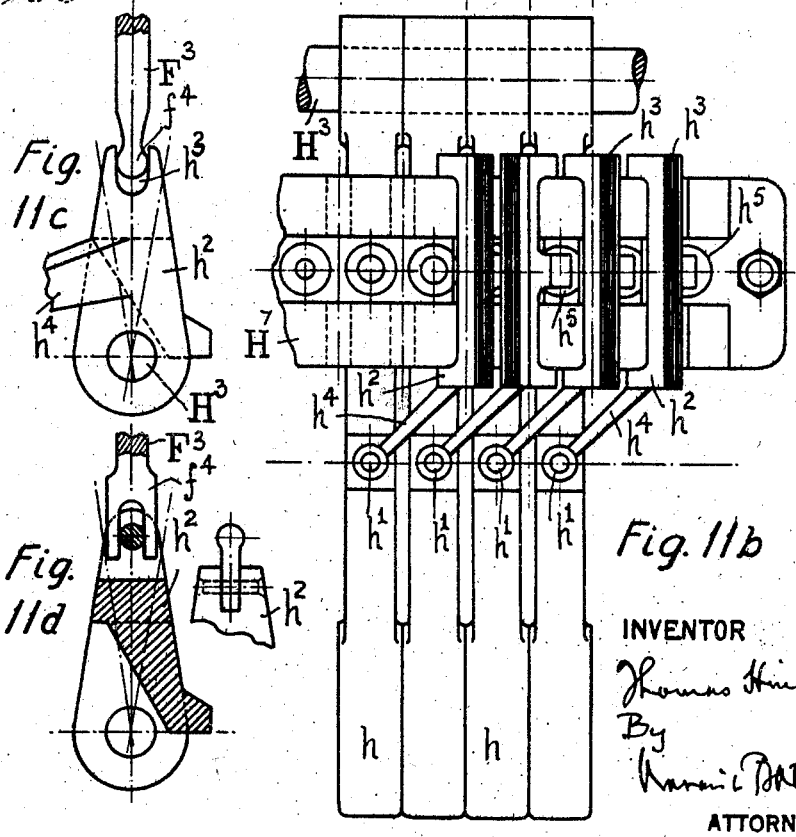
Fig. 11c
Fig. 11d
Fig. 11b

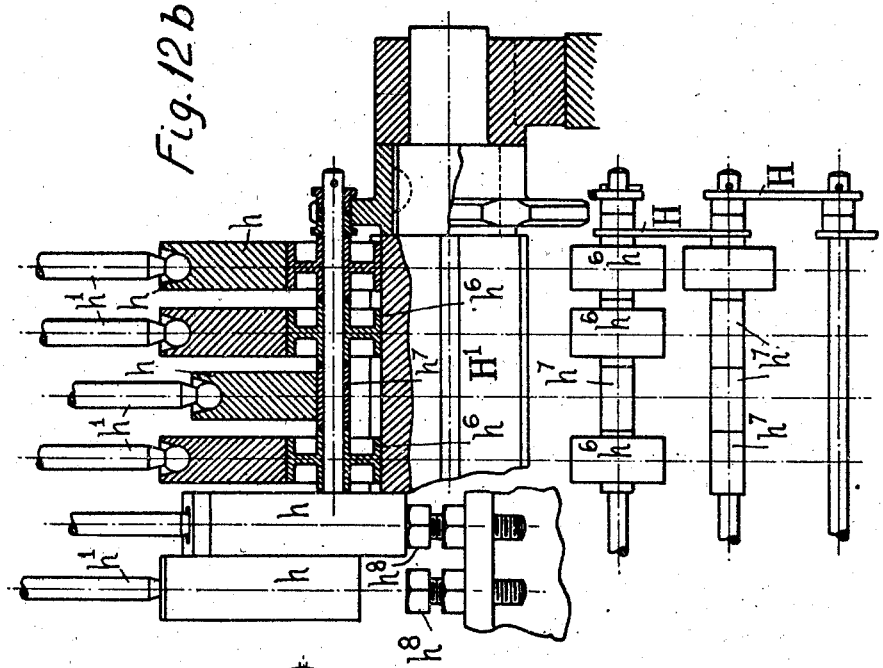
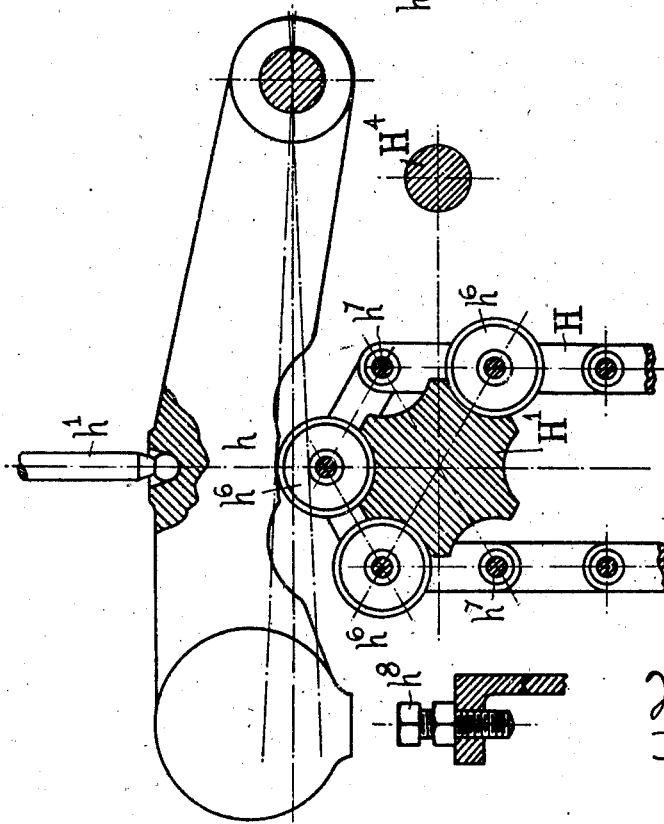

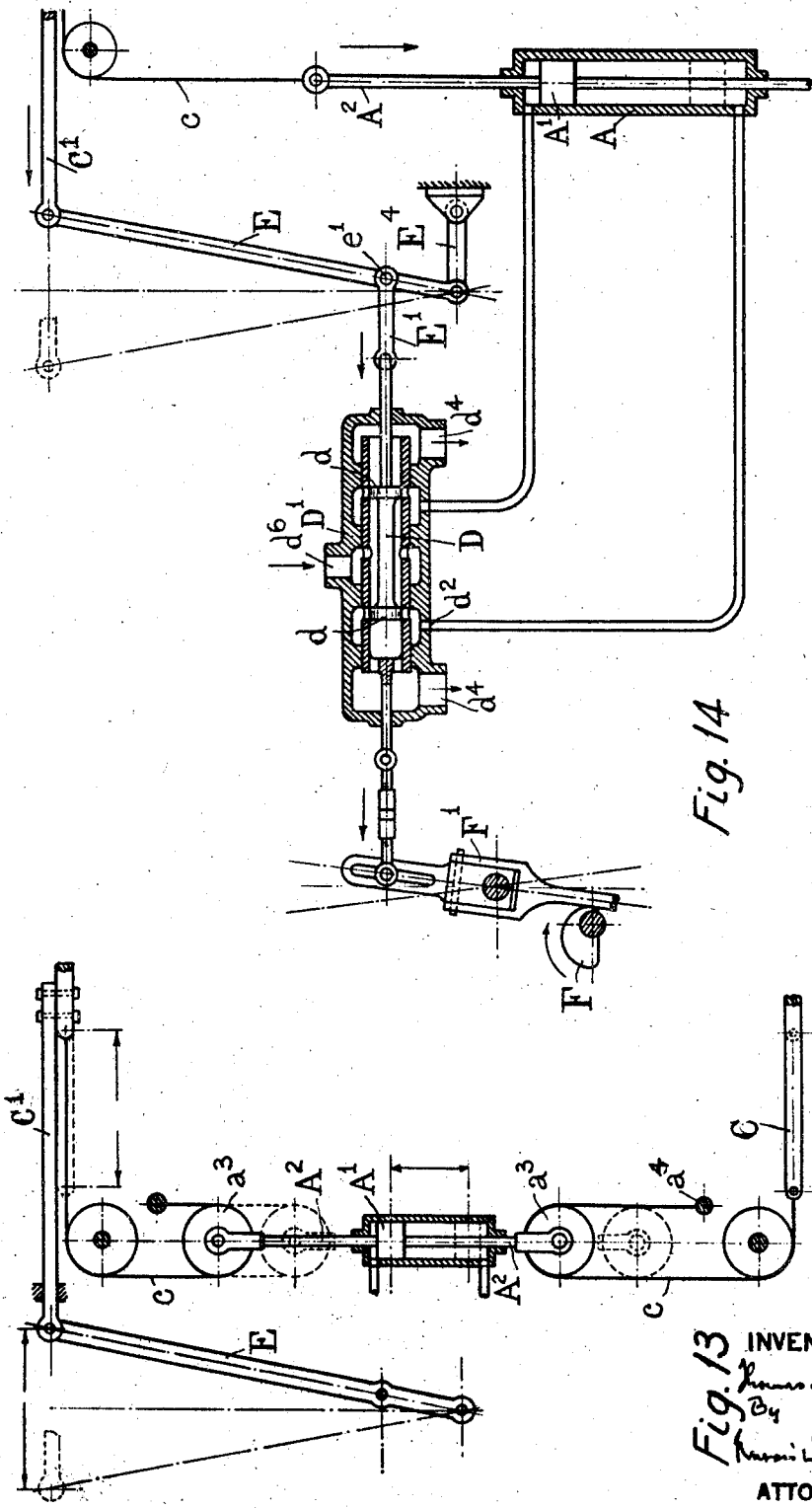

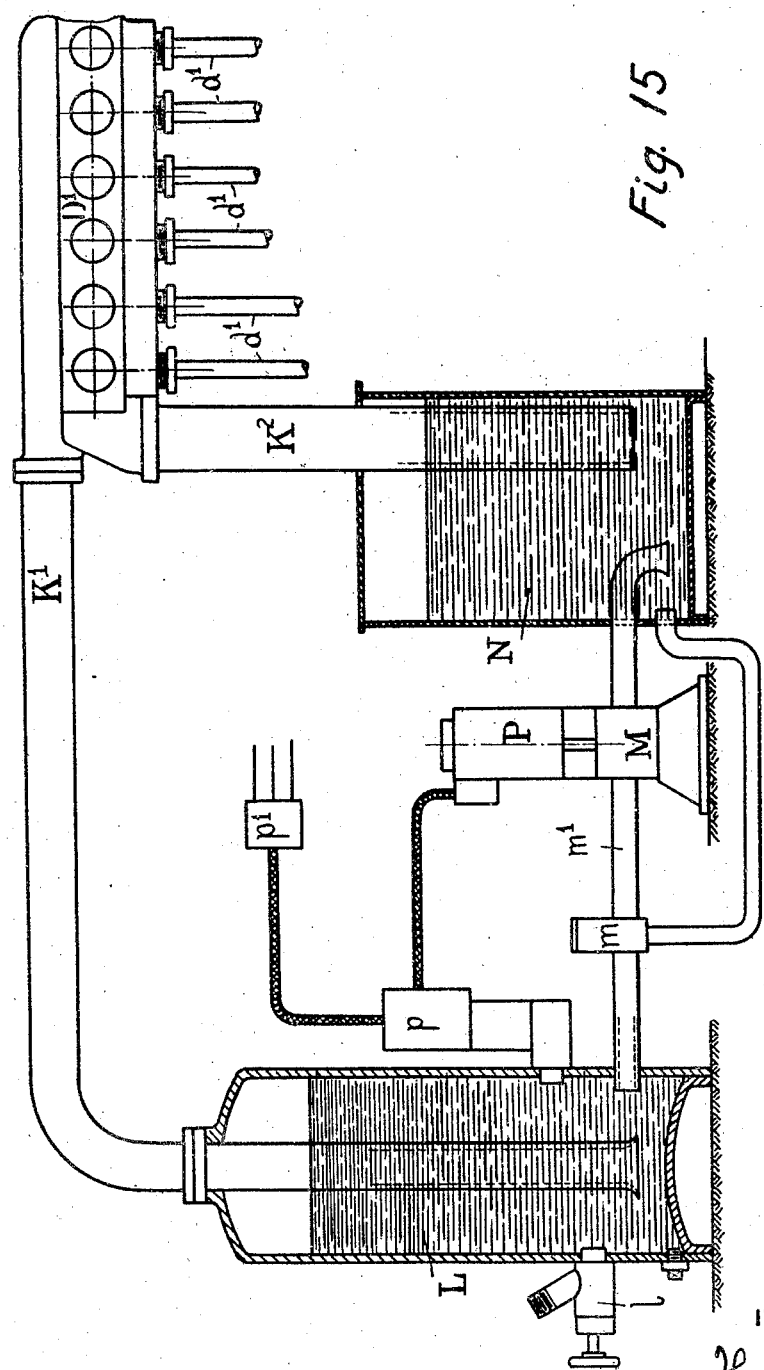

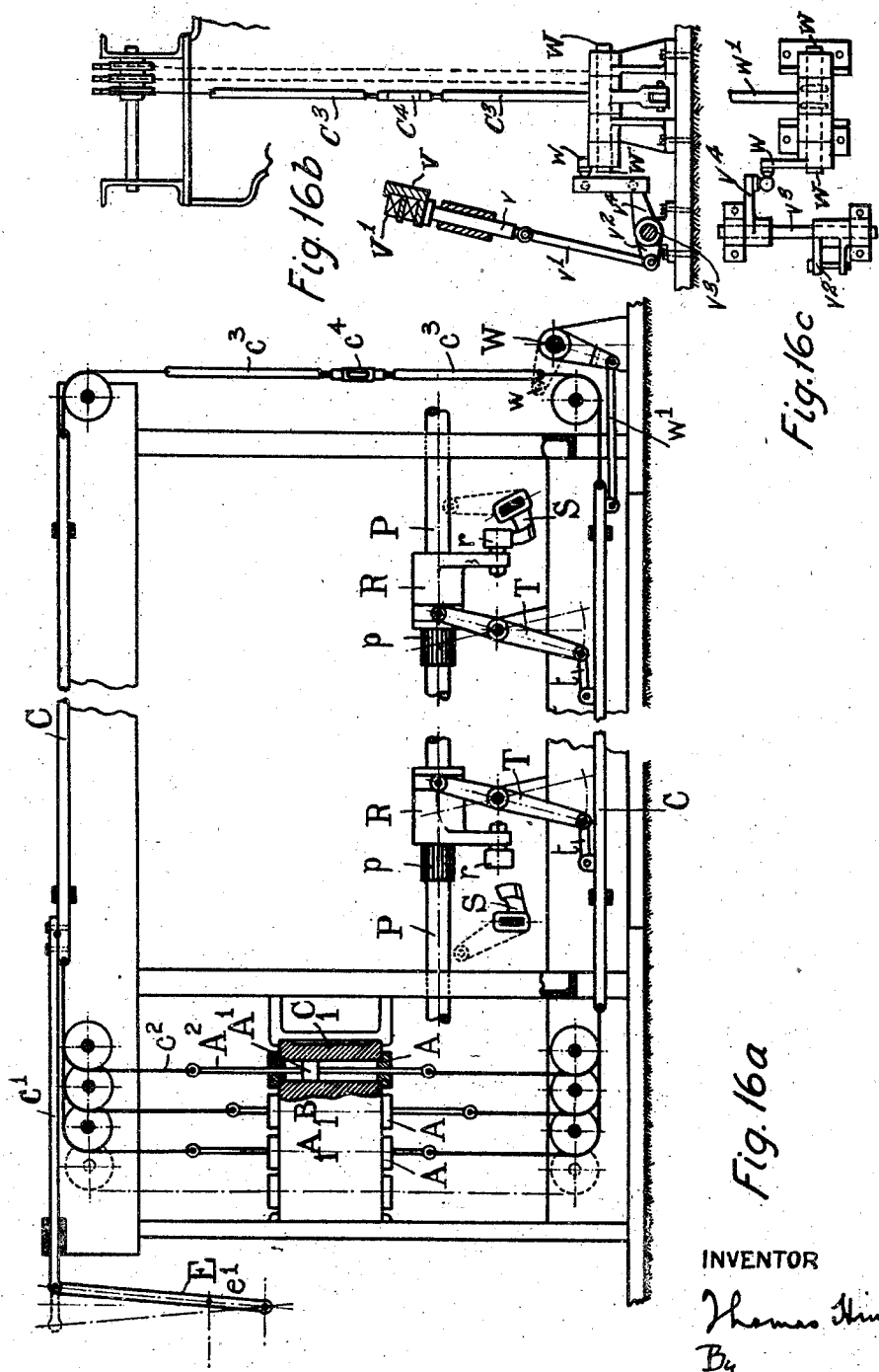

Patented Aug. 12, 1947

2,425,676

UNITED STATES PATENT OFFICE 2,425,676

HYDRAULIC SHEDDING MEANS

Thomas Hindle, Witton, Blackburn, England

Application September 23, 1944, Serial No. 555,492
In Great Britain October 18, 1943

16 Claims. (Cl. 139—55)

1

This invention relates to improvements in means for actuating the heald-frames of looms for weaving and for controlling the picking or loose motions of looms.

The heald-frames of a loom are controlled and actuated by a dobby or other means so that the various groups of warp yarns are lifted and lowered during successive picks (insertion of the weft yarn) in accordance with the design of the cloth being woven and the chief object of the present invention is to provide a selective shedding mechanism of improved construction which will be silent in operating, the mechanism being particularly suitable for use with heavy and wide looms. Further objects are the provision of similar mechanisms for controlling the picking motion and box motions of a loom.

According to the invention the heald-frames are lifted and lowered positively on the picking motion and box motion and are controlled by power pistons working in hydraulic cylinders under the influence of fluid pressure, the preferred medium being oil supplied under appropriate pressure by a pump or oil reservoir, the supply of oil to the cylinder being controlled by a piston valve and/or sleeve through a floating lever the sensitive end or an intermediate point of which is given a timed and substantially harmonic motion by a suitable direction and velocity controlling mechanism.

The invention is illustrated in and will be described with reference to the accompanying drawings in which:

Fig. 1 is a schematic lay out of a form of the invention illustrating the general principle thereof, Figs. 2a, 2b and 2c are line diagrams illustrating means for varying the stroke of the power piston, Fig. 3 is a line diagram illustrating a modified form of the invention, Fig. 4a shows in front elevation the lay out of a loom equipped with hydraulic shedding mechanism, Fig. 4b is a plan showing the relative positions of the cylinders, Fig. 4c is a plan of the left hand end of Fig. 4a, Fig. 5a is an elevation and Fig. 5b a plan (both partly in section) of one arrangement of power cylinders, Fig. 6a is an elevation and Fig. 6b a plan (both partly in section) of an alternative arrangement of power cylinders, Figs. 7a and 7b are an elevation (half in section) and a plan (also half in section) of mul-

2 tiple piston valves controlling the supply of liquid to the cylinders of the power pistons, Figs. 8a, 8b and 8c illustrate the construction of linkage connections, Fig. 9a shows one arrangement of mechanism for actuating the piston valve, Fig. 9b shows a modified construction thereof, Fig. 9c shows a known form of intermittent gearing for actuating the chain barrel of the mechanism shown in Fig. 9a, Fig. 9d shows means for holding the chain barrel steady during dwell periods, Figs. 9e and 9f show different positions assumed by the cams of Fig. 9a during one operation, Fig. 9g is a timing diagram of the mechanism, Figs. 10a, 10b and 10c show side elevation partly in section, front elevation partly in section and a detail view of the direction and velocity controlling mechanism, Fig. 11a is a plan partly in section through the centres of the shafts of the cams controlling the mechanism actuating the piston valves, Fig. 11b is a plan and Fig. 11c an elevation of parts of the mechanisms shown in Fig. 9a, Fig. 11d is a sectional elevation of a modified construction of Fig. 11c.

Fig. 12a is a sectional elevation of the chain mechanism and feeler levers operated thereby shown in Fig. 9a, Fig. 12b is an elevation partly in section of the chain barrel and feeler levers, Fig. 13 shows means whereby the stroke of the power pistons may be reduced, Fig. 14 shows an alternative construction of piston valve, Fig. 15 shows a means of supplying oil under pressure to the power cylinders, Figs. 16a, 16b and 16c are respectively a diagrammatic front elevation and plan showing the mechanism applied to the control of a "pick-at-will" picking mechanism and the actuation of the box mechanism of a multi-shuttle box loom.

The diagrammatic lay out shown in Fig. 1, illustrates the general principle of operation of the invention. It shows one hydraulic cylinder A of the double acting type arranged to actuate one heald-frame B, the movement of the power piston A1 being transmitted to top and bottom sliding tension bars C (which will be hereinafter more fully described) by chains c passing over pulleys C¹ rotating freely on pins carried by the frame structure and from the tension bars C to the heald-frame B by the chains b passing over the pulleys b¹.

Flow of oil to and from the power cylinder A is regulated by a piston valve D which is of the internal admission type and having no inside or outside lap. The valve D is arranged to slide in a valve box $D^1$ provided with ports $d^1$ and $d^2$ communicating with each end of the power cylinder A and also with ducts $d^3$ and $d^4$ for entry and exit of the oil used to actuate the power piston.

When the piston valve is in its midway or neutral position, as shown in Fig. 1, the collars $d$ of the valve D exactly cover the ports $d^1$ and $d^2$ communicating with the power cylinder A. When the valve is in that position, flow of oil ceases, and the power piston $A^1$ is held stationary by reason of the oil so retained and sealed in each end of the cylinder A. Slight upward movement of the valve D will allow oil under pressure to flow from the middle portion $d^5$ the valve D to the top of the power cylinder A, and, at the same time, oil to pass out from the bottom of the cylinder to the exhaust $d^4$. As a result of such upward movement of the valve, the piston $A^1$ will be forced downward. Movement of the valve D in the reverse direction acts to cause the power piston $A^1$ to move upwards.

The piston valve D is controlled in its movement through the intermediary of a floating lever E, in such a manner that the valve may be actuated either by movement of the power piston $A^1$ or by movement initiated by and derived from the direction and velocity controlling mechanism, or both simultaneously.

In the particular example shown in Fig. 1, one end of the floating lever E is connected to the power piston rod and its opposite end is connected by the link $E^1$ to the direction and velocity controlling mechanism. The piston valve D is connected to the floating lever E through the intermediary of the link $e$ at an intermediate point $e^1$ in its length. The position of the point $e^1$ is determined so that the ratio of the lengths of the two arms of the floating lever E when point $e^1$ is regarded as its fulcrum, shall be equal to the ratio of the stroke of the power piston $A^1$ and the movement of the end of the floating lever E derived through the link $E^1$ from the direction and velocity controlling mechanism, which may be of any suitable construction.

In the arrangement illustrated in Fig. 1, movement of the power piston $A^1$ is initiated and controlled by a pair of rotating cams F through a pivoted lever $F^u$ hereinafter called the follower lever $F^1$, only one of which cams can engage the follower lever at any one time. The follower lever $F^1$ is pivotally connected to the link $E^1$ so that the displacement of the follower lever $F^1$ consequent upon engagement with either cam is transmitted to the sensitive or control end of the floating lever E. In Fig. 1, the following lever $F^1$ is about to be engaged by the upper cam F, and as the lever is pivoted at $f^1$ the movement derived from the cam is transmitted by link $E^1$ to the floating lever E. On the upper cam F commencing to displace the follower lever $F^1$, the connected end of the floating lever E is correspondingly displaced as is also the piston valve D from its midway or neutral position. As a consequence of such movement of the piston valve D oil under pressure is admitted to the top end of the power cylinder A and simultaneously, oil is released from the bottom end thereof, so that the power piston $A^1$ commences its downward stroke, and by means of the pulleys and chains the heald-frame B connected thereto commences its upward travel.

Such movement of the piston rod $A^2$, however, is transmitted to the end of the floating lever E connected to the link $e$ and acts to restore the piston valve D to its initial or neutral position. The piston $A^1$ continues to move during displacement of the follower lever $F^1$ by the cam, as the piston valve D is maintained slightly out of its neutral position until the displacement of cam follower lever $F^1$ is completed whereupon the power piston A immediately terminates its stroke by returning the piston valve D to its neutral position, by means of the floating lever E.

At the end of the down stroke of the power piston $A^1$ the floating lever is in the position shown by the dotted lines, the new position of the follower lever being also shown by dotted lines and when the follower lever $F^1$ is engaged by the lower cam F action in the reverse direction results.

The camshafts $f$ of the cams F are geared together and to the loom crankshaft by equal gears. The displacement of the follower lever $F^1$ and of the power piston $A^1$ and its connected healdframe B can therefore be caused to proceed over any desired fraction of the loom crankshaft revolution. Furthermore, by means of cams F having the profile of half eccentrics, such displacement is harmonic, as is desirable for heald actuation. The cam profile may be designed to provide harmonic motion of the heald-frame in from about 120 degrees to 200 degrees of one revolution of the loom crankshaft, or its equivalent.

In order to produce a perfect shed for the shuttle passage, the lifts or travels of the healdframes must be graded so as to increase progressively from front to back. The power pistons may have a common stroke for all heald-frames, and levers or their equivalent introduced to grade the lifts of the heald-frames. Alternatively, the displacement of the control cams F may be graded so as to increase progressively from front to back, when the strokes of the respective power pistons will be correspondingly graded.

Thus in Fig. 2a, which is a line diagram of a floating lever E of the type shown in Fig. 1, the displacement of the sensitive end of the floating lever E is related to the stroke of the power piston $A^1$ and increasing or decreasing the former will effect a proportional increase or decrease of the latter, while maintaining a common point of connection $e^1$ for the piston valve. Such variation of the stroke of the power piston D may be derived, as stated, from cams F of graded displacement.

It is preferred however, to vary the ratio of the linkages actuating the piston valves, i. e. the distance of the point $e^1$ from the piston rod $A^2$ and the link $E^1$ respectively to effect the necessary graduation of stroke of succeeding healdframes. This may be effected for instance if the point of attachment of the vertical link $E^1$ to the follower lever is adjustable as to radius from pivot $e^1$ the stroke of the power piston will vary correspondingly. In Fig. 2b, the stroke is shown to be varied by adjusting the point $e^1$ of connection of the piston valve D along the floating lever E. Alternatively, the actuating link $E^1$ may be attached at varying distances along the sensitive end of the floating lever E as represented by Fig. 2c.

Fig. 3 is a line diagram illustrating a modification in which the floating lever E is attached at one end to the piston rod $A^2$ and at the other end is connected to the piston valve D, while the cam follower lever is connected at an intermediate point along the floating lever E. In this arrangement the directly actuated piston valve D shown by the dotted lines requires crossed-over pipes to the cylinder A but this cross-over may be avoided by the intermediate reversing lever $E^2$ which may be of any desired ratio. The strokes of the several pistons $A^1$ may be graded by varying any of the points of linkage attachment as previously described for the arrangement of Fig. 1, but it is preferred to vary the intermediate point of attachment on the follower lever $F^1$ of the link $E^1$ from the floating lever E as shown in Fig. 4a.

In Figs. 1 and 3, a friction brake $F^2$ is indicated, as bearing on the end of the outer arm of the follower lever $F^1$. The purpose of the brake $F^2$ is to hold the follower lever $F^1$ stationary, except when engaged by either cam F. The cams F readily overcome the frictional resistance of the brake $F^2$.

Figs. 4a, 4b and 4c show the general lay out of a loom equipped with the hydraulic shedding motion. The heald-frames B are actuated by the top and bottom tension bars C which are connected to the piston rods $A^2$ of the power pistons $A^1$ by the chains c passing over the pulleys $c^1$ each pair of tension bars C being connected by a chain $c^3$ joined together by the turnbuckle $c^4$. As each cylinder A occupies more room than the pitch of the healds B, the cylinders are arranged in banks, in the present case, in four banks, and the individual cylinders are staggered to set them in alignment with their respective heald-frames as shown in plan in Fig. 4b. In a similar manner, the end pulleys $c^1$ at top and bottom are likewise staggered as shown in plan in Fig. 4c.

The mechanical circuit comprising the piston rod $A^2$, connecting chains c attached thereto and the top and bottom tension bars C is completed by chain $c^3$ at the opposite end of the loom which is adjusted to suitable working tension by turnbuckle $c^4$. Lighter chains b are attached at intermediate points along the tension bars C and passing over pulleys $b^1$ rotating on pins carried in the loom structure, are attached to the heald-frames, each such chain being provided with a turn-buckle $b^2$.

In order that the floating lever E for each power cylinder A shall have the motion of its respective piston rod $A^2$ without the complication that would otherwise be entailed due to the dispersion of the power cylinders A in several banks, each top tension bar C is provided with an extension or slider bar $C^1$ sliding in a guide $C^2$ and extending over the end of the loom. The projecting ends of these slider bars $C^1$ reproduce the movement of their respective power pistons $A^1$ and heald-frames B and form a convenient point of attachment for the floating levers E, one of which is shown in Fig. 4a.

The piston valves D are indicated diagrammatically and are arranged in two banks, in order that they may be in alignment with their respective power cylinders A. The lower end of each floating lever E is connected to its corresponding piston valve D while an intermediate point $e^1$ of the floating lever is adjustably connected to the upper arm of the cam follower lever $F^1$, by the link $E^1$. The point of attachment of the link $E^1$ to the follower lever $F^1$ increases in distance from the fulcrum point $f^1$ from front to back for each mechanism so that the lift of the heald-frames shall increase progressively from front to back as already stated.

Details of one form of power cylinder A and piston $A^1$ are shown in Figs. 5a and 5b which show four cylinders arranged in three banks, the centres a of the cylinders from front to back corresponding with the pitch of the heald-frames and being in alignment with them. Fig. 5a shows the the power piston fitted with split rings $a^1$ and the cylinder covers are provided with glands $a^2$ for packing. The pipe connections $a^3$ from the piston valve boxes are provided in the cylinder covers. This example shows an arrangement for actuating 12 heald-frames.

Figs. 6a and 6b show an alternative construction of cylinder block in which the pipe connections are in the cylinder block. Two rows of cylinders A are formed in one block with drilled ports $a^4$ brought out to screwed connections $a^5$ at the front. Two of such blocks provide for actuating 16 heald-frames. Alternatively, as shown in Fig. 6b, a single row cylinder block may be used in combination with a two row block to provide for actuating 12 heald-frames. In a similar manner, three rows of cylinders may be formed in one block and drilled ports brought out to one face for ready access to the pipe connections. In Fig. 6a, the piston A is shown fitted with cup leathers $a^6$ and the cylinder covers are made pressure tight on the piston rods by means of packing leathers $a^7$.

Details of an arrangement of multiple piston valves in two banks are shown in Figs. 7a and 7b. Each bank comprises a multiple valve box $D^2$ with piston valves D disposed at centres equal to twice the pitch of the heald-frames. The two valve boxes and their valves are mounted so that their valve centres are equally offset, with each valve in alignment with its corresponding power piston and heald-frame.

Oil under pressure enters a valve box by the common duct $d^6$ from which ports $d^7$ communicate with the central cavity $d^5$ of each individual valve. The piston valves D are a slidable but oil pressure-tight fit in ported sleeves $D^3$ which are a press fit in the valve box. Cavities $d^{10}$ surrounding the ends of each valve lead to screwed connections $d^9$ for the pipes which communicate with the power cylinders. As shown, the collars d of the piston valve, when this is in its midway or neutral position, exactly cover the ports $d^8$ in the sleeve. The ports $d^8$ provide a relatively large area for passage of oil for a small displacement of the valve on either side of its neutral position. Oil released from the ports $d^{10}$ leaves the valve box by the common exhaust connection $d^4$.

Fig. 7a shows the lower end of the floating lever E forked to engage and actuate the piston valve rods $D^4$ and in this respect is a larger scale reproduction of Fig. 4a.

As it is desirable to avoid play (slackness) in the linkage connections, even after long periods of operation, it is preferred that all the essential linkage points shall be provided with anti-friction bearings, as shown in Figs. 8a, 8b and 8c. Each piston valve rod $D^4$ is screwed into a boss G with an extension carrying a ball or roller bearing $g^1$ working in the forked end $G^1$ of a link g connected in similar manner to the floating lever E. The latter connection may be permanently riveted up but the former is dismountable by means of a screwed stud $g^2$.

Fig. 9a shows one arrangement of piston valve actuation, the linkage connections being of the construction shown at $G^1$ in Figs. 8a, and 8b and 8c. The floating lever E is connected at its upper end to the slider bar $C^1$ which moves in unison with the power piston and its attached heald-frames as already described. The lower end of the floating lever E is connected by a link g to one piston valve $D^1$ which is indicated as in its midway or neutral position. The cam follower lever is formed in two parts $F^3$ and $F^4$, the lower member $F^3$ being pivoted on the pin $f^3$ so that it can swing laterally in relation to the upper member $F^4$. The upper member $F^4$ is connected to the floating lever E by the link $E^1$ which is adjustable in respect of its length by the turnbuckle $e^4$ and the adjustable slider connection $e^5$ of the link $E^1$ to the upper arm $F^4$ of the follower lever enables the stroke of the power piston to be increased or decreased to suit the required depth of the shed from front to back. As shown by the solid lines, the maximum piston stroke is obtained, while as shown by the dotted lines, the minimum stroke results. The upper arm $F^4$ of the lever is curved so that alteration of the slider position thereon does not alter the position of the power piston when this is half-way through its stroke. Alternatively, the arm $F^4$ may be straight as shown at Fig. 9b—any necessary modification of the heald-frame position at the extremities of its travel being corrected by adjustment of the length of the link $E^1$ by a turn-buckle such as the turn-buckle $e^4$.

The follower lever as a whole is pivoted at $f^1$ about which point it oscillates when its lower end is engaged and propelled by one or other of the two cams F and as above described the lower arm $F^3$ is pivoted at $f^3$ so that it may be swung at right angles to its movement derived from the cams F. This sideways movement of the arm $F^3$ is controlled by a rocker lever $h^2$ in accordance with the design chain H by means of the feeler lever $h$ and push rods $h^1$. Dependent on the sideways position of the arm $F^3$, the follower lever is engaged by one or other of the cams F. In Fig. 9a the left hand cam F is shown at the commencement of its effective half revolution.

The chain barrel is rotated one pitch for each revolution of the loom crankshaft, and therefore, for each revolution of the shafts of the cams F in order to bring the design chain H successively into effect. Fig. 9c shows a known construction of maltese wheel J on the shaft of the chain barrel and cam $J^1$ mounted on shaft $H^4$ with pin $j$ for obtaining this motion which is suitable for actuating the chain barrel in the required manner. A fluted cam $J^2$ and spring loaded locating roller $j^1$ as shown in Fig. 9d, is preferably used in combination to hold the chain barrel steady in its dwell positions.

Fig. 9e shows the left hand cam F on completion of its effective half revolution, during which it has propelled the follower lever $F^3$ to the right, in which position it is retained by the friction brake $F^2$ applied to the top end of the arm $F^4$.

Fig. 9f shows the cams F after a further quarter revolution when the cam lobes are in opposition, leaving the follower lever $F^3$ held stationary around pivot $f^1$ by its friction brake $F^2$ while the sideways location of the lower hinged arm $F^3$ is controlled by its rocker lever whilst the cams F are in opposition. The friction brake offers no resistance to sideways movement of the lever $F^3$.

Fig. 9g is a timing diagram, in which the circle represents one revolution of the loom crankshaft, or its equivalent. 2 is the front centre or beat-up position. From 1 to 3 the healds change, these normally being half changed at 2. The healds dwell in their up or down positions from 3 to 1, during which time the shuttle passes through the shed. The chain barrel is rotated one pitch, i. e. one-sixth revolution with the six tooth wheel shown in Fig. 9c, while the crank revolves from 4 to 8, that is 120 degrees. The feeler lever $h$ is lifted or lowered, as the case may be, during angle 5 to 7 (about 60 degrees) and is stationary during periods 4 to 5 and 7 to 8, although the chain barrel is rotating during the entire period 4 to 8. The contour of the feeler lever $h$ where this engages the design chain is suitably shaped to comply with these requirements, see Fig. 9a also Fig. 12d.

Figs. 10a, 10b and 10c (which are associated with Figs. 11 and 12) show larger scale views of the different parts of the direction and velocity controlling mechanism.

The hinged arms $F^3$ and $F^4$ of the follower levers are pivoted on bar $f^1$ which is carried in the framing, and the lower arms $F^3$ are hinged at $f^3$ at right angles to the pivot bar $f^1$ whereby the lower ends may be swung about the central position so as to be engaged by either of the two offset cams F relating to each lever. When engaged and displaced by a cam, the adjustable slider $e^5$ on the upper arm $F^4$ of the lever transmits the harmonic or other motion derived from the cam to the floating lever through the link $E^1$ in a manner already described.

Each pair of cams F on the two cam shafts $F^6$ and $F^7$ are relatively offset, so that they do not mutually interfere when revolving, and so that either cam may engage the follower lever depending upon its sideways position at the time.

The lower ends of the arms $F^3$ of the hinged follower levers are controlled by the rocker levers $h^2$. Each such rocker lever may be positively actuated in both directions by its corresponding feeler lever $h$ or as shown, it may be positively actuated in one direction and returned by a spring plunger $h^5$.

The rocker lever $h^2$ and the end of the arm $F^3$ of the follower lever are shaped so as to afford mutual engagement while permitting free movement of the follower lever under influence either of the rocker itself or of the cams or both.

Fig. 11c shows one suitable construction in which the rocker lever $h^2$ has a groove $h^3$ in which the rounded or cylindrical end $f^4$ of the arm $F^3$ can slide and rock. Fig. 11d shows an alternative form, with the end of the hinged lever slotted and engaging a rounded wire or rail formed or mounted on the rocker lever.

Fig. 11a is a sectional plan through the centres of the camshafts $F^6$ and $F^7$ which are geared together and driven at loom crankshaft speed. The dotted lines $F^8$ indicate a third gear meshing with and driving the camshaft gears at crankshaft speed.

Figure 1:
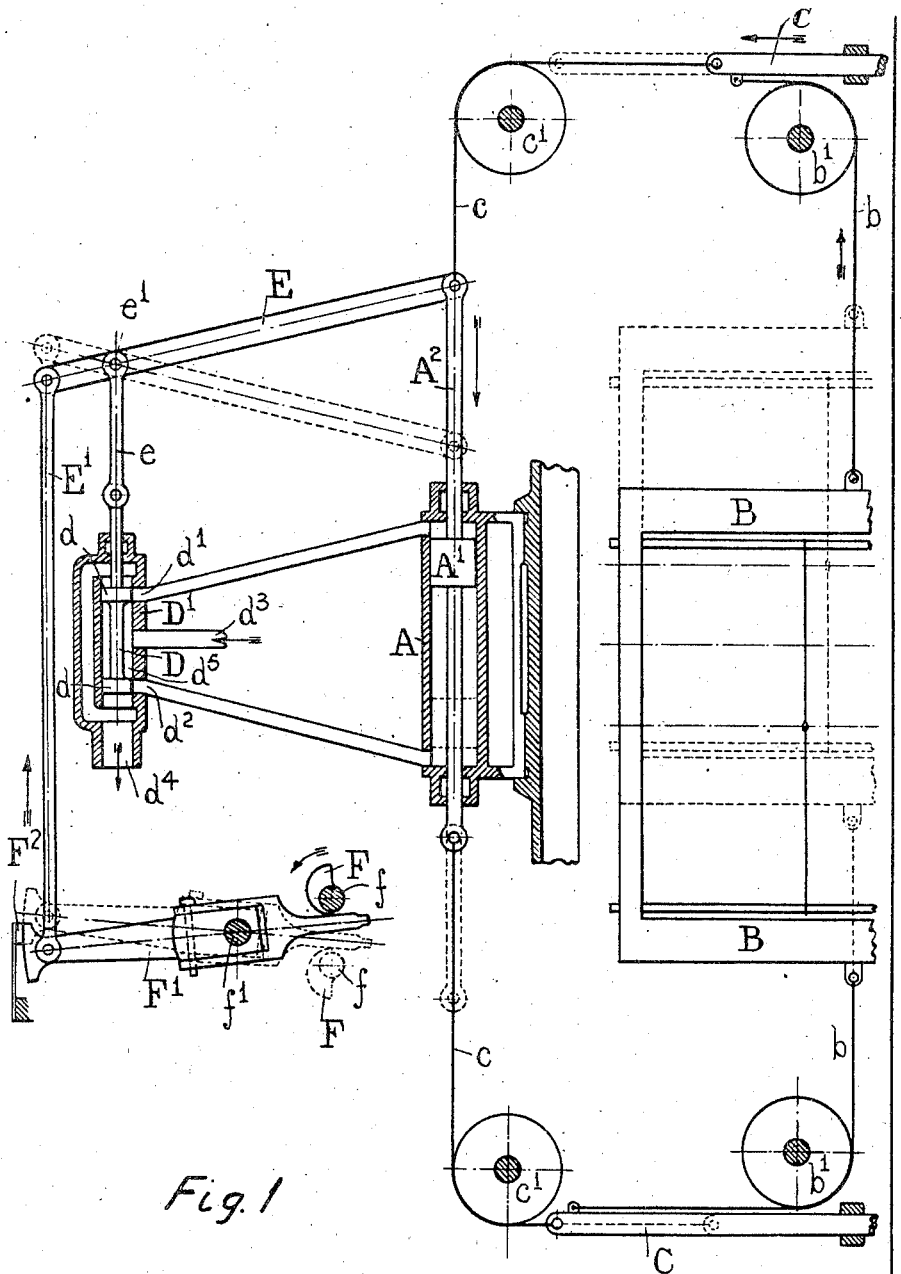
Figure 2A:
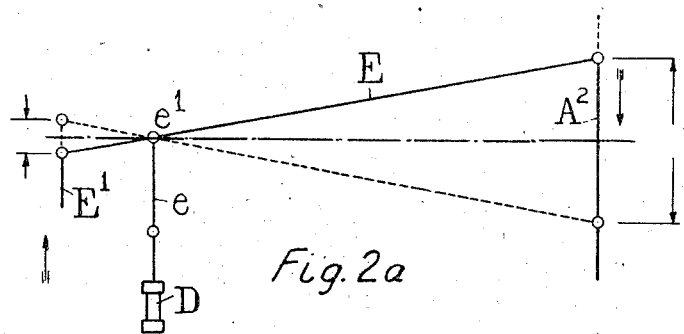
Figure 2B:
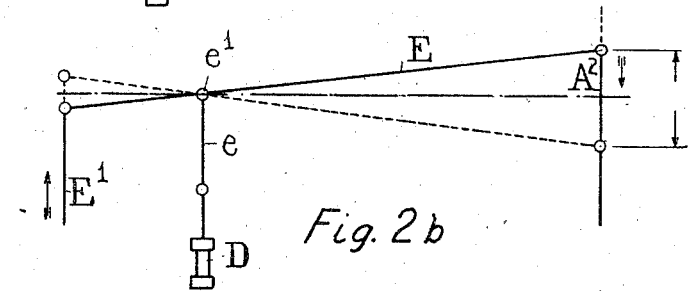
Figure 2C:
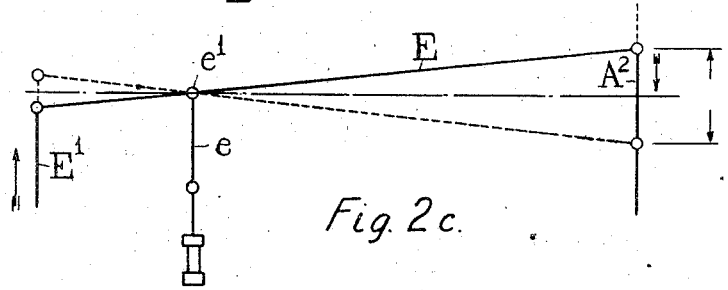
Figure 3:
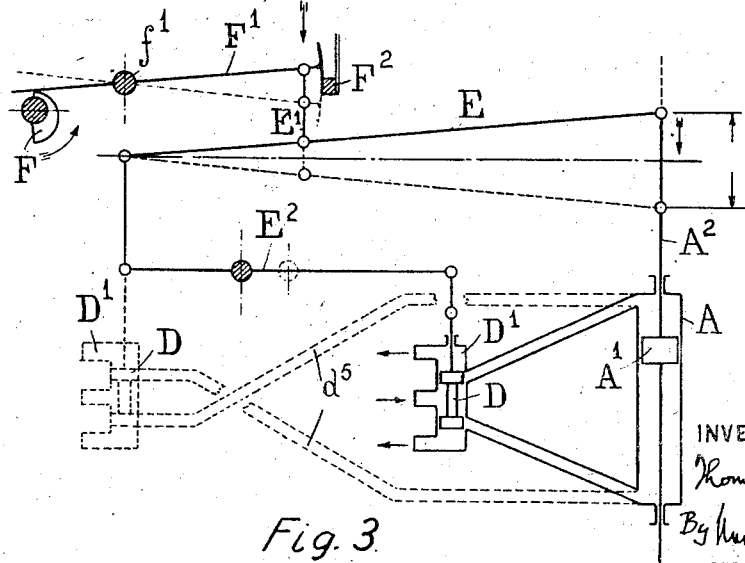
Figure 5A:
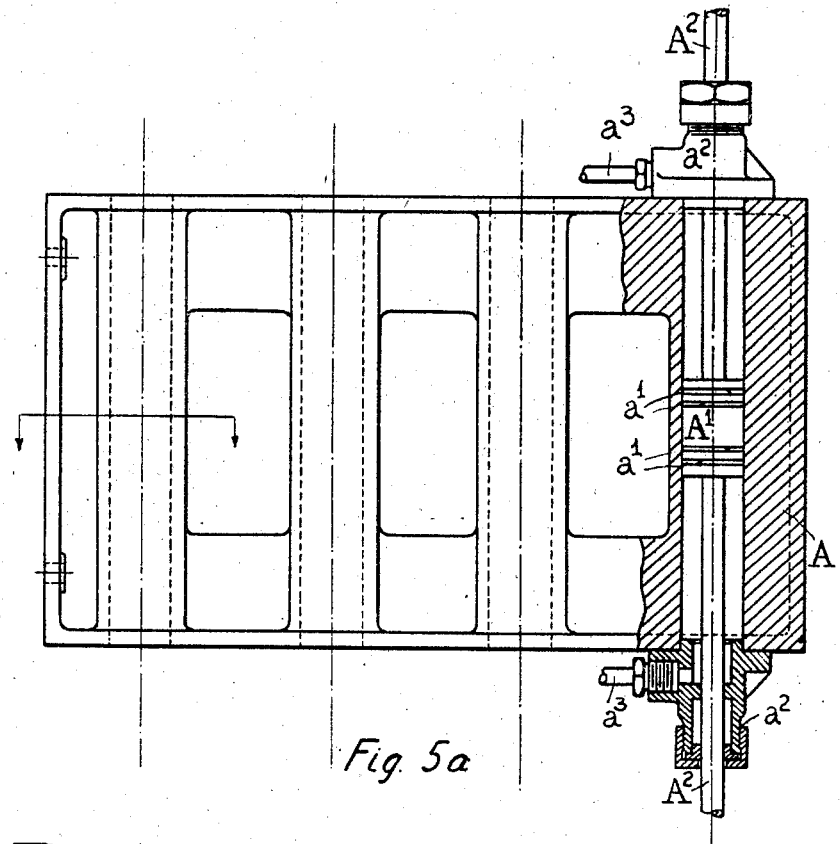
Figure 5B:
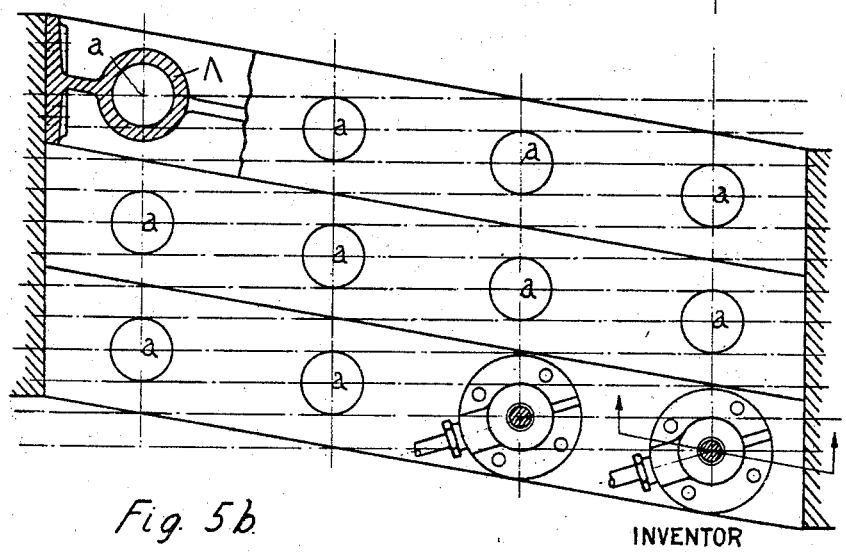
Figure 6A:
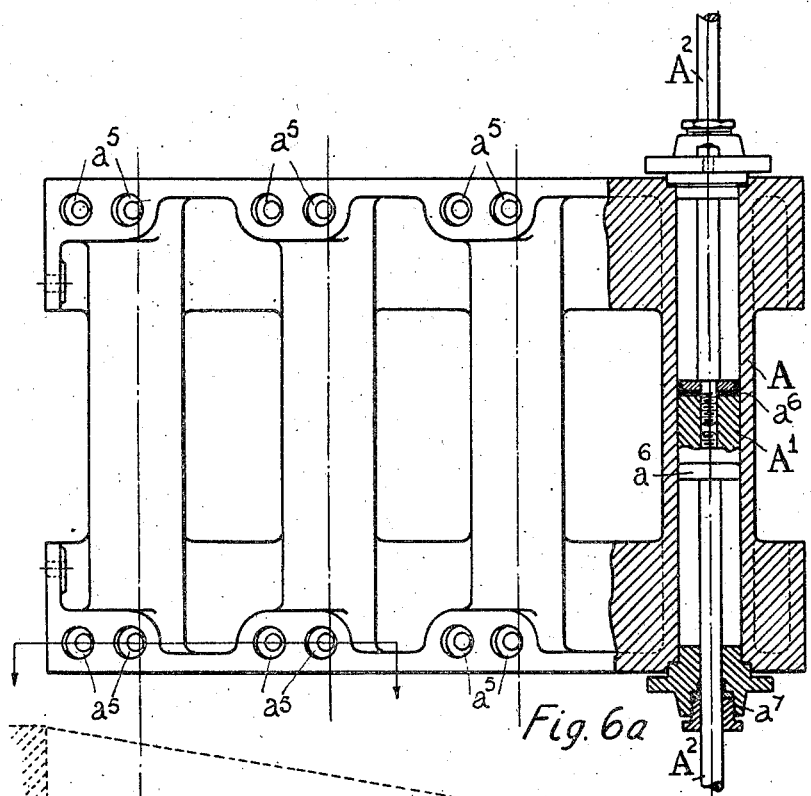
Figure 6B:
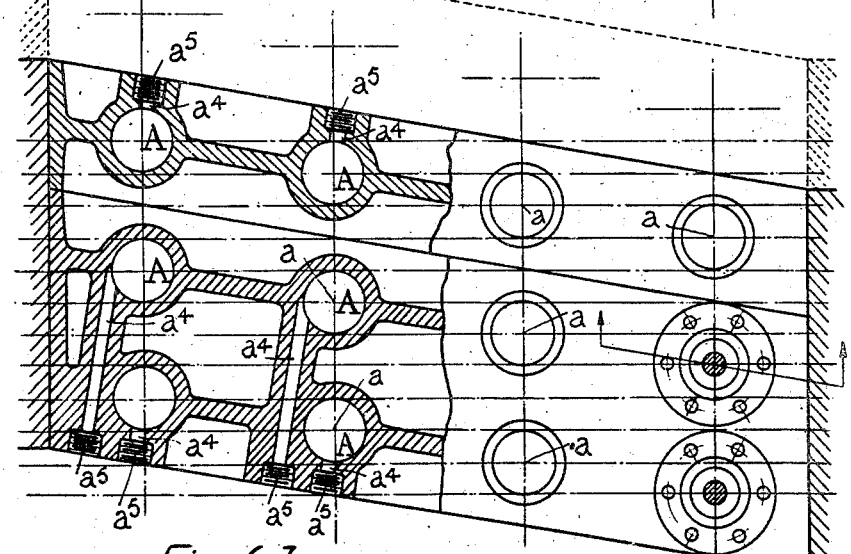

The cams F (on the right) are in opposition and clear of the arms $F^3$ of the levers. It is in this general position when the selection for the next phase occurs. This view clearly shows the relative offset spacing of the two sets of cams F, also of the arms $F^3$ of the follower levers, shown in section. To the left of Fig. 11a the cams F are shown on completing their displacement of their respective follower levers.

Fig. 11b is a plan showing the rocker levers $h^2$, the rail $H^7$ on which they are mounted, the spring plungers actuating the rocker levers in one direction, and the feeler levers which control the position of the rocker levers $h^2$ as indicated by the weaving design chain. In this drawing, the rocker levers are shown grooved at $h^3$ for the reception of the rounded or cylindrical guide ends of the arms $F^3$ of the follower levers as in Fig. 11c.

Fig. 12a is a sectional elevation of the design chain H and chain barrel $H^1$ showing the actuation of the feeler levers $h$ by the rollers $h^6$ or blanks $h^7$ on the design chain, and the push rods $h^1$ which transmit the movement of the feeler levers $h$ (as determined by the design chain dependent upon whether the feeler lever $h$ is lifted by a roller $h^6$ or lowered by a blank $h^7$) to the rocker levers, thereby locating the lower arm of the follower levers so as to be engaged respectively by the appropriate cams. An adjustable stop is provided at $h^8$ to limit the lower position of the feeler levers $h$ as when two or more blanks occur in succession on the design chain, or when this is removed for a change of design.

Fig. 12b is a part sectional elevation through the chain barrel $H^1$ and feeler levers $h$ and shows the actuation of the latter by the rollers $h^6$ and $h^7$ (risers and fallers) of the design chain H.

Fig. 13 shows a method whereby the stroke of the pistons $A^1$ of power cylinders A may be appreciably reduced in length with a corresponding increase of piston load. Each end of the power piston rod $A^2$ carries a pulley $a^3$ and the chain $c$ is anchored to the loom framing. This arrangement provides a movement of the heald-frames and of the slider bar $C^2$ equal to twice the piston stroke.

Fig. 14 shows an alternative form of piston valve, in which both the piston valve D and the ported sleeve in which it slides are capable of external actuation.

As shown, the cam actuated lever $F^1$ is connected to the sleeve and the piston valve is connected to the stabilizing lever E. One end of this lever is flexibly anchored by link $E^4$ and the other end moves in unison with the power piston and heald-frame as above described.

As the sleeve is moved to the left (referring to Fig. 14) the ports in the sleeve are uncovered to admit oil to the top of the power cylinder A and to release oil from the bottom, thus causing the piston $A^1$ to commence its down stroke. Such movement of the piston causes a corresponding movement of the top end of the stabilizing lever E, which moves the piston valve D also to the left so tending to re-close the ports in the displaced sleeve.

As the movement of the sleeve derived from the cam F continues, the movement of the power piston A, heald-frame, stabilizing lever E and piston valve D also continues, until the cam completes its displacement so that the movement of the sleeve ceases, whereupon the rest of the mechanism also stops upon the piston valve collars $d$ again covering the ports in the sleeve. Movement in the reverse direction is obtained in a similar manner by a second cam (not shown in Fig. 14) as already described.

Fig. 15 shows a method of supplying one or more loom dobbies of the construction herein described with oil under appropriate pressure. Considering one loom, the demand for oil during the first half revolution of the crankshaft is variable depending upon the proportion of heald-frames moving at any one time. During the second half revolution when the healds are stationary in their up or down positions, no oil is required, or merely sufficient to make up incidental leakage.

In Fig. 15 only one multiple valve box $D^1$ is shown, but two such boxes will normally be required and will be connected in parallel on the main supply and return oil pipes $K^1$, $K^2$. The valve boxes $D^1$ are supplied with oil under appropriate pressure from an accumulator L which serves to deal with the intermittent oil demand and to average the load on the pump. The valve box $D^1$ is connected to the dobby power cylinders A by the pipes $d^1$.

A convenient form of accumulator comprises a pressure tight vessel L. By means of the shut-off valve and connection $l$, the accumulator vessel L is initially charged with air (or other suitable gas) at about 100-lbs. per square inch. The shut-off valve is then closed.

Oil is drawn by the pump M from the oil sump N and forced under pressure into the accumulator L in which the initial air content is compressed into the upper part. An electric motor P drives the oil pump and is controlled by a switch $p^1$. A pressure actuated switch $p$ acts to stop the motor and pump whenever the maximum desired pressure is attained in the accumulator. A pressure relief valve $m$ is provided on the pipe $m^1$ between pump and accumulator so as to open on excess pressure and to discharge surplus delivery of oil back to the oil sump N. This valve normally remains closed, and is provided as a precaution against derangement of the pressure control.

The oil from the accumulator passes to the valve box by pipe $K^1$ and the oil released from the power cylinders returns to the sump by pipe $K^2$.

While the invention as particularly described herein utilizes double-acting power pistons and cylinders it will be understood that each such piston may be substituted with equal effect, by two single-acting pistons or plungers working in opposition.

While the invention has been described with reference to the actuation of the heald-frames of a loom it can as previously indicated be readily adapted for controlling loom picking motions of the "pick-at-will" type or for actuating the shuttle boxes of multi-shuttle looms and Figs. 16a, 16b and 16c illustrate such application.

In Figs. 16a, 16b and 16c three cylinders A each with its power piston $A^1$ are shown, two of these $I^A$ and $I^B$ actuating the boxes at each end of the loom in the same way as has hereinbefore been described with reference to the control of the healds and the third $I^C$ controlling the picking mechanism.

The piston $A^1$ of the cylinder $I^C$ is connected to the tension bar C as previously described and the supply of oil to the cylinder is controlled by a valve corresponding to the previously described valve D and floating lever E. On the crank shaft P or a shaft running at crank shaft speed are mounted two sliding picker arms R (one at each side of the loom), the arms rotating with the shaft P but sliding on the splined portions $p$ thereof. Each arm R carries a picking bowl $r$ adapted to engage the corresponding picker cam S when the arm is moved by the controlling mechanism into the necessary position on the shaft P. In Fig. 16a the right hand picker arm R is shown in the "pick" position and left hand arm in the "miss" position.

The arms R are controlled by the rocking levers T connected by the link $t$ to the bottom tension bar C.

As illustrated in Figs 16b and 16c each shuttle box V with the shuttles shown therein is carried on the top of an arm $v$ which is raised and lowered by a link $v^1$ from the lever $v^2$ affixed on a shaft $v^3$ rocked by a second lever $v^4$. The movement of the lever $v^4$ is controlled by an arm $w$ on one end of an oscillating shaft W operated by a link $w^1$ from the corresponding bottom tension rod C (Fig. 16a).

I claim:

1. In a loom for weaving the combination with the heald-frames of a corresponding number of hydraulic cylinders and power pistons therein, piston valves controlling the supply of fluid to the cylinders to operate the pistons therein, floating levers, each controlling the movement of a piston valve, a pair of sliding bars to which the corresponding heald-frame is connected, chains connecting the sliding bars to opposite sides of the piston, guide pulleys over which the chains pass, an extension on one of each pair of sliding bars connected to the corresponding floating lever, and a velocity and direction controlling mechanism for each floating lever comprising a pair of rotating cams, a pivoted lever adapted to be engaged by either of said cams, means for selecting the cam to engage the pivoted lever, and a link motion connecting the pivoted lever of the said velocity and direction controlling mechanism to a sensitive point on the floating lever, whereby the valve may be actuated by movement of the power piston, by movement of the velocity and direction controlling mechanism or by both simultaneously.

2. In a loom for weaving the combination with the heald-frames of a corresponding number of hydraulic cylinders and power pistons therein, the cylinders being arranged in staggered banks, piston valves controlling the supply of fluid to the cylinders to operate the pistons therein, floating levers, each controlling the movement of one piston valve, a series of pairs of sliding bars, one pair for each heald-frame to which the heald-frames are connected, chains connecting the sliding bars to opposite sides of the corresponding piston, guide pulleys over which the chains pass, the guide pulleys being staggered to correspond with the centres of the staggered cylinders, an extension on one of each pair of sliding bars connected to the corresponding floating lever and a velocity and direction controlling mechanism for each floating lever comprising a pair of rotating cams, a pivoted lever adapted to be engaged by either of said cams, means for selecting the cam to engage the pivoted lever, and a link motion connecting the pivoted lever of the said velocity and direction controlling mechanism to a sensitive point on the floating lever, whereby the valve may be actuated by movement of the power piston, by movement of the velocity and direction controlling mechanism or by both simultaneously.

3. Means for actuating an operating element of a loom, comprising a fluid pressure operated power cylinder having a piston therein connected to said element, a controlling valve having fluid pressure connections with said cylinder for controlling the supply of pressure fluid thereto, operating means for said valve, and means connecting said piston, valve and operating means for opening said valve to supply pressure fluid to said cylinder to cause movement of said piston and for transmitting movement from said piston to said valve tending to close said valve.

4. Means for actuating an operating element of a loom, comprising a fluid pressure operated power cylinder having a reciprocatory piston therein connected to said element, a reciprocatory valve having fluid pressure connections with said cylinder for controlling the supply of pressure fluid thereto, reciprocatory operating means for said valve, and a floating lever connected to said piston, valve and operating means for transmitting movement from said operating means to said valve in a direction to open it and for transmitting movement from said piston to said valve in a direction to close it.

5. Means for actuating an operating element of a loom, comprising a fluid pressure operated power cylinder having a reciprocatory piston therein connected to said element, a controlling valve connected to said cylinder and movable into different positions to supply pressure fluid to said cylinder to move said piston in one or the other direction, a pair of oppositely positioned actuating cams, a pivoted operating lever having a part thereon movable laterally of its plane of pivotal movement and cooperable with one or the other of said cams to swing said lever in one or the other direction, and means connecting said piston, valve and lever for transmitting movement from said lever to said valve in a direction to supply pressure fluid to said cylinder and to transmit movement from said piston to said valve in a direction to interrupt the supply of pressure fluid to said cylinder.

6. A loom comprising shedding mechanism, a fluid pressure operated power cylinder having a piston therein connected to the shedding mechanism for operating it, a valve connected to the cylinder for controlling the supply of pressure fluid thereto, operating means for the valve, and connecting means between the piston, valve and operating means for transmitting movement from the operating means to the valve to open it to supply pressure fluid to the cylinder and for transmitting movement from the piston to the valve to close it.

7. A loom according to claim 6, wherein said connecting means comprises a floating lever having pivotal connections with said piston, valve and operating means.

8. A loom according to claim 6, wherein said piston, valve and operating means are reciprocatory for effecting changes in the operation of said shedding mechanism, and including pattern control means for controlling the reciprocation of said operating means.

9. A loom comprising a heald-frame, a power cylinder having a reciprocatory piston therein connected to said frame for moving it in opposite directions, a valve having pressure fluid connections with said cylinder for controlling the reciprocations of said piston, an operating member, and means connecting said piston, valve and operating member for transmitting motion from said operating member to said valve to move it in a direction to effect supply of pressure fluid to said cylinder and for transmitting motion from said piston to said valve to move it in a direction to interrupt such supply of pressure fluid.

10. A loom according to claim 9, wherein said connecting means comprises a floating lever having pivotal connections with said piston, valve and operating member.

11. A loom comprising a heald-frame, a power cylinder having a piston therein connected to said frame for moving the latter in opposite directions, a valve having pressure fluid connections with said cylinder for supplying pressure fluid thereto to effect movements of said piston in opposite directions, a pivoted operating lever for said valve, means including a floating lever having pivotal connections with said piston, valve and operating lever for transmitting motion from the operating lever to the valve to move it in a direction to admit pressure fluid to the cylinder to cause movement of said piston in one direction and for transmitting movement of said piston in said direction to the valve to move it in a direction to interrupt said admission of pressure fluid to the cylinder.

12. A loom comprising, a heald-frame, a reversible motor connected to said frame for moving the latter in opposite directions, controlling means for controlling the operation of said motor in one or the other direction, a pivoted lever connected to said controlling means and movable in one or another direction for operating said controlling means to effect operation of said motor in one or the other direction, and a pair of cams selectively operable upon said lever to move it in one or the other of said directions.

13. A loom according to claim 12, wherein said lever carries a part movable laterally of its plane of movement about its pivotal axis for selective operation by said cams.

14. A loom according to claim 12, including pattern control means, and means controlled by said pattern control means for rendering said cams selectively operable upon said lever.

15. A loom according to claim 12, wherein said lever carries a part movable laterally of its plane of movement about its pivotal axis for selective operation by said cams, and including pattern control means, and means controlled by said pattern control means for moving said part laterally into position for operation by one or the other of said cams.

16. A loom comprising heald-frames, a fluid pressure operated motor having a cylinder and a reciprocatory piston therein connected to each of said frames for moving the frames simultaneously in relatively opposite directions, a reciprocatory valve having fluid pressure connections with each cylinder for admitting pressure fluid thereto to effect movement of the respective piston in one or the other direction, an operating lever for each valve pivoted to swing in one or the other direction about its pivotal axis, means including a floating lever connected to each piston and the respective valve and operating lever for transmitting movement of said operating lever to the respective valve to operate the latter to admit pressure fluid to the respective cylinder to move the piston therein in one direction and for transmitting movement from said piston to the respective valve to operate the latter to interrupt said admission of pressure fluid, said operating lever carrying a part movable laterally of the plane of pivotal movement of said operating lever, a pair of cams relatively offset in different planes and operative to respectively swing said operating lever in opposite directions about its pivotal axis, a pattern chain, and means controlled by said chain for selectively moving said part of said operating lever into the plane of one or the other of said cams for movement of said operating lever thereby.

THOMAS HINDLE.

REFERENCES CITED

The following references are of record in the file of this patent:

UNITED STATES PATENTS

| Number | Name | Date |
| --- | --- | --- |
| 1,963,473 | Richter | June 19, 1934 |
| 924,886 | Burrows | June 15, 1909 |
| 2,146,922 | Timberlake | Feb. 14, 1939 |
| 2,106,504 | Lindquist | Jan. 25, 1938 |
| 1,164,094 | Hutchins | Dec. 14, 1915 |
| 209,907 | Masterson | Nov. 12, 1878 |
| 2,377,800 | Mascarenhas | June 5, 1945 |